United States Patent [19]

Snyder

[11] 4,122,001
[45] Oct. 24, 1978

[54] WORM-HARVESTING METHOD AND APPARATUS

[76] Inventor: Lester E. Snyder, Rte. 1, Box 1206, Bandon, Oreg. 97411

[21] Appl. No.: 777,948

[22] Filed: Mar. 16, 1977

[51] Int. Cl.² .............................................. B07C 1/10
[52] U.S. Cl. .................................... 209/675; 209/933
[58] Field of Search ................................ 209/85, 352; 280/47.13 R, 47.13 B, 79.1 A

[56] References Cited

U.S. PATENT DOCUMENTS

| | | | |
|---|---|---|---|
| 1,030,653 | 6/1912 | Dyer | 209/352 |
| 2,037,038 | 4/1936 | Levy | 209/352 |
| 3,105,698 | 10/1963 | Bonarrigo et al. | 280/79.1 A |

*Primary Examiner*—Allen N. Knowles
*Attorney, Agent, or Firm*—Klarquist, Sparkman, Campbell, Leigh, Hall & Whinston

[57] ABSTRACT

Worms are harvested by placing worm-containing bedding material from a breeding bin on a flat breaking board mounted within a wooden frame. The bedding material is pushed from the board onto an adjacent screen mounted within the frame at approximately the same level as the board. The screen is covered by the bedding material to a uniform depth while exposed from above to light. A worm-receiving tray with dark inner bottom surface is removably mounted in darkness within the frame below the screen. The frame is leg-supported at one end, while its screen-end rests on the top edge of a bin to be harvested. An upper layer of the bedding material is gradually skimmed from the screen into the bin, causing the worms to work their way deeper into the bedding material remaining on the screen. The skimming process is repeated until all worms have worked their way down through the bedding material to the screen. From there the larger worms crawl through the screen into the tray below. The smaller worms which cannot reach the bottom of the tray remain on the screen and are returned to the bin with the bedding material.

11 Claims, 3 Drawing Figures

U.S. Patent  Oct. 24, 1978  4,122,001
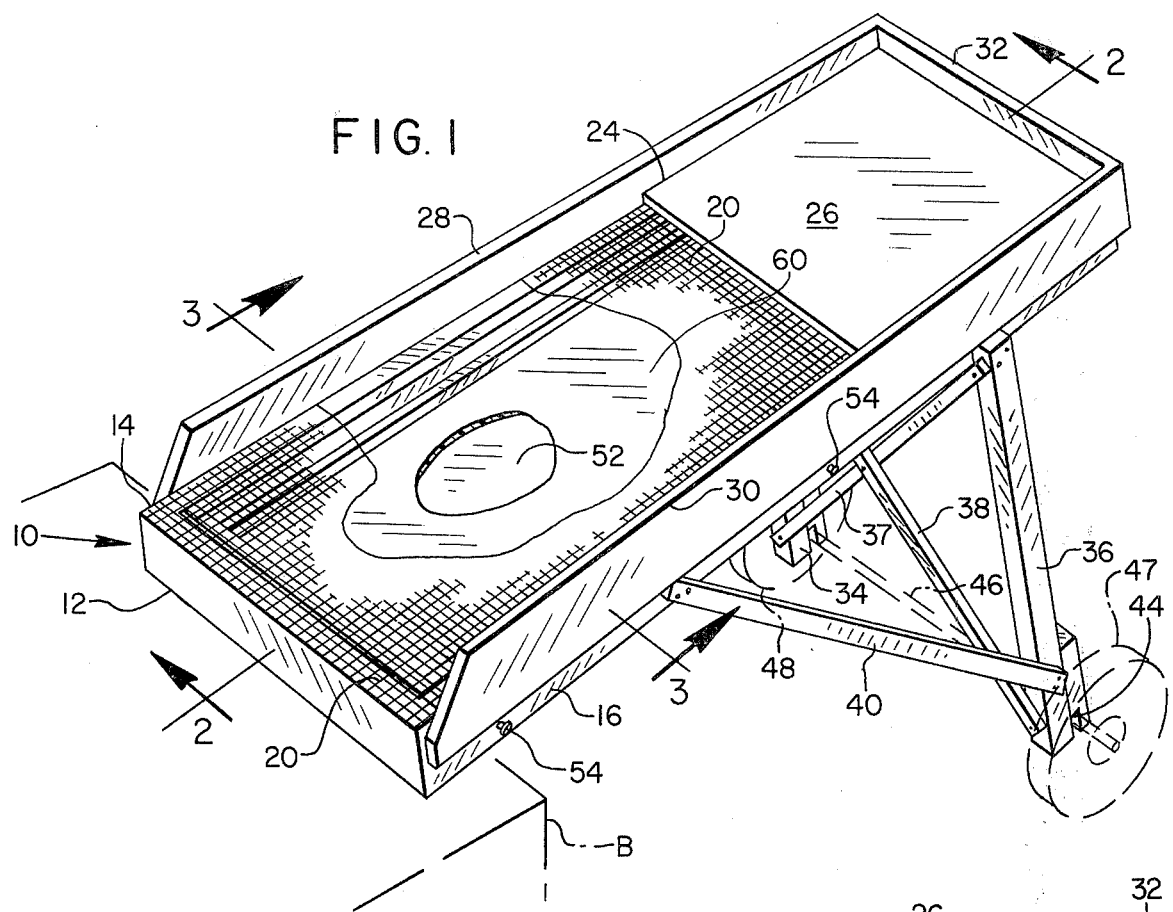
FIG. 1
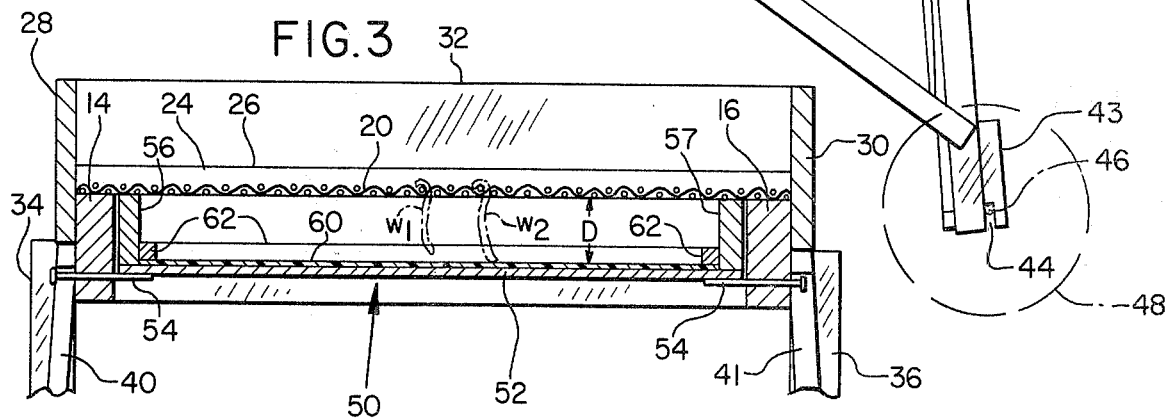
FIG. 2
FIG. 3

WORM-HARVESTING METHOD AND APPARATUS

BACKGROUND OF THE INVENTION

1. Field of the Invention

The present invention relates to a worm-harvesting method and apparatus.

2. Description of the Prior Art

Worms are now big business in the United States and elswhere. They are raised, harvested, packaged and marketed on a large scale, not only for fish bait but also as a source of protein for pet foods and in some countries for human consumption.

Worm farming is done by raising and breeding the worms in so-called breeding boxes or bins, of which there are many types and styles, some of which are shown in U.S. Pat. Nos. 2,748,747; 2,867,055; 3,566,836; and 3,654,903. Typically the breeding box includes bedding material consisting of peat moss and a worm food composition such as manure and cottonseed meal in a layer some four inches or more thick overlying a layer of worm castings which can be sold for fertilizer. Most bins work on the principle that worms are repelled by light and seek darkness. Therefore, in a typical breeding box, the top is covered with a black plastic above the bedding material which keeps the worms within their bedding material and keeps moisture within the box. Because mature worms lay one egg per week for approximately 20 years, periodically a bin must be either harvested to remove the mature worms or "cut" by transferring one-half of the worm population to another bin.

Heretofore worms have been harvested commercially using a mechanical shaking process. Bedding material containing worms is placed on a screen at a slight inclination to the horizontal and then the screen is vibrated or shaken so that the immature worms and bedding material sift through the screen and the larger, mature worms drop over the lower end of the screen where they are collected for market. This prior harvesting process is harmful to the worms, damaging and killing many. The apparatus is also expensive.

Worms can also be harvested by hand. In this method worm-filled bedding material is spread out in thin layers and the larger worms are laboriously hand picked from the bedding. However, naturally this is time consuming and therefore very expensive.

From the foregoing it will be apparent that there is a need for a faster, easier and less damaging method and apparatus for harvesting worms.

SUMMARY OF THE INVENTION

The present invention is a method and apparatus for harvesting worms by which the worms are induced to harvest themselves. The harvesting method and apparatus of the invention exploit two characteristics of worms in a new and unique manner to induce the worms to become self-harvesting. One such characteristic is that a worm is repelled by light and attracted by darkness. The other is that a worm will not move from one place to another unless it can feel where it is going.

Accordingly a principal object of the invention is to provide a worm-harvesting method and apparatus by which the worms are self-harvested without the need for mechanical shaking or hand picking. This provides a harvesting method and apparatus which are fast, require only one person to operate, and do not damage the worms.

Another object is to provide a harvesting method and apparatus as aforesaid which automatically sort and separate the mature worms from the immature worms, eggs, and bedding material and return the latter to the bin from which they were taken.

Another important object is to provide a worm harvester which is simple and inexpensive to manufacture, operate and maintain. The harvester can be made of readily available materials such as wood by a reasonably handy person and does not require the use of any prime mover since the harvesting process is essentially a manual one in which most of the manual labor is performed by the worms themselves.

In a preferred embodiment of the invention a rectangular frame, open top and bottom, is covered from one end partially along its length by a screen and the rest of the length by a flat breaking board. A tray removably mounted inside the frame just below the screen has a dark inside bottom surface spaced a distance below the screen which is no greater than the minimum length of the worms desired to be harvested. The frame is supported at its breaking board-end on legs which are of a length such that when they contact the ground and the screen end of the frame is supported on the top edge of the bin, the screen surface slopes toward the bin.

In harvesting the worms, the bedding material is removed from the bin and placed on the breaking board where it is broken up and gently spread over the screen to a uniform depth until the screen is completely covered. The upper side of the harvester is exposed to overhead light, but the bottom of the tray is shielded from the light by the bedding material on the screen and the frame itself. Therefore the overhead light tends to drive the worms down into the bedding material. The top layer of bedding material is skimmed from the screen back into the bin and replaced by additional bedding material from the breaking board. The skimming process is then repeated. The overhead light drives the worms down into the bedding material progressively as the skimming is repeated. When the worms reach the screen, the larger worms work their way through the screen to the dark inside bottom of the bin drawer where they are collected. The smaller worms, however, unable to reach from the screen to the bottom of the tray, do not drop from the screen but cling to it instead. When all of the bedding material has been returned to the bin by the repeated skimming process, all of the eggs and immature worms have been returned to the bin with it. The tray is then removed through the bottom of the frame to complete the harvesting process.

The foregoing and other objects, features and advantages of the present invention will become more apparent from the following detailed description, which proceeds with reference to the accompanying drawings.

BRIEF DESCRIPTION OF THE DRAWINGS

In the drawings:

FIG. 1 is a perspective view of a worm harvester in accordance with the invention;

FIG. 2 is a longitudinal sectional view of the harvester of FIG. 1 taken in the plane 2—2 of FIG. 1; and FIG. 3 is a transverse sectional view taken along the plane 3—3 of FIG. 1.

DETAILED DESCRIPTION OF PREFERRED EMBODIMENT

With reference to the drawings, a harvester in accordance with the invention includes a rectangular wooden frame 10 including an end frame member 12, opposite side frame members 14, 16 and a cross frame member 18 between the opposite ends of the frame. These frame members can be conveniently made of 2 by 4 inch stock. A screen 20 of, for example, hardware cloth of about $\frac{1}{4}$ inch to $\frac{1}{2}$ inch mesh material is stretched between the opposite side frame members 14, 16 and between end frame member 12 and cross frame member 18 and secured in place along the upper edges of such members to define a planar screen surface. A metal strap 22 extends from side to side of the frame in contact with the underside of the screen. The strap is secured at its opposite ends to opposite side frame mebers 14, 16 to help support the screen midway along its length.

A flat breaking board 24 borders the end of the screen 20 at cross frame member 18 and extends from such member to one end of the frame opposite end frame member 12. Breaking board 24 is secured to the upper edges of cross frame member 18 and side frame members 14, 16. The upper surface 26 of the breaking board lies parallel to and slightly above the surface of screen 20, and in no event should such breaking board surface be below the level of screen 20. The upper surface of the breaking board is preferably painted white or covered with a white or other light-colored tile.

The frame includes opposite side board extensions 28, 30 extending the length of the frame above the level of the screen 20 and breaking board 24 for the purpose of retaining bedding material on such surfaces. A similar end board extension 32 at the breaking board end of the frame joins the two side boards 28, 30. The two side board extensions are attached one to each side frame member 14, 16. The opposite end of the frame above the plane of screen 20 remains open to facilitate the harvesting operation, more specifically, the sweeping of bedding material from such end of the screen.

A pair of legs 34, 36 are attached at their upper ends to opposite sides of the frame and extend downwardly and outwardly therefrom in the region of breaking board 24 to support that end portion of the frame above ground level. Cross braces 37, 38 between the legs provide lateral leg support, and angle braces 40, 41 between the lower legs and side frame members provide longitudinal leg support. The lower end portion of each leg includes a rearward extension block 43 including a slot 44 for slidably receiving the axle shaft 46 of a wheel and axle set including wheels 47, 48. This construction enables the weight of the frame to hold the axle in place on the legs for transporting the frame when desired. Yet the wheel and axle set is easily removed from the legs simply by lifting the breaking board end of the frame to permit the axle to slide from its leg slots 44.

A tray 50 is removably mounted within frame 10 just below screen 20 so that the bottom 52 of the tray is substantially parallel to the planar surface of the screen. The tray is held in place within the frame by four pins 54. The pins project into the interior frame space through holes in side frame members 14, 16 to engage the bottom wall 52 of the tray as shown best in FIG. 3. When the pins are removed from beneath the tray, the tray can be dropped downwardly from beneath the frame. The tray includes opposite sidewalls 56, 57 and opposite endwalls 58, 59 with the upper edges of such side and endwalls terminating near the underside of the screen. The tray is sized to be approximately coextensive with the open screen area within the confines of the frame, as will be apparent from FIGS. 2 and 3. An important feature of the tray is the dark color of its inside bottom surface. This dark inside surface is achieved preferably by lining it with a sheet 60 of black plastic held in place by wooden strips 62 along inside joints between the bottom and the sides and ends of the tray.

Another important feature of the tray is that the distance D shown in FIG. 3 between the inside bottom surface of the tray and the screen 20 is approximately the same as or very slightly less than the minimum length of the worms which are desired to be harvested. Put another way, the distance D should be no greater than the minimum length of the worms to be harvested. For example, if the minimum length of worm to be harvested is $2\frac{1}{2}$ inches, which is usual in the case of Red Wigglers, the distance D should also be $2\frac{1}{2}$ inches or very slightly less than this.

Worm-Harvesting Method

The entire harvesting procedure takes place either outdoors in daylight, or if indoors, with an artificial overhead light source.

To harvest worms in accordance with the invention using the worm harvester just described, the normally unsupported screen end of the harvester frame is rested on the upper edge of a worm bin B to be harvested, in the manner shown in FIG. 1. The wheel and axle set 46, 47, 48 is removed from legs 34, 36 so that the harvester will be relatively stable. The legs are of a length so that when the end 12 of the harvester frame is rested on the top edge of the bin B, the screen slopes at a small angle downwardly toward the bin from the breaking board. Approximately the top 3 or 4 inches of bedding material containing most of the worms in the bin are removed from the bin through its open top using, for example, a pitchfork. The bedding is placed in a pile on the surface 26 of breaking board 24. There the clumps of bedding material are broken up and gently pushed onto the screen surface until the entire screen is covered with bedding material to a uniform depth of several inches. At this point the inside of the tray 50 is in darkness because the harvester frame, bottom 52 of the tray and bedding material on the screen overhead block all light from it. The worms, thus repelled by the light overhead and attracted by the darkness below, work their way from the upper surface of the bedding material deeply into it and toward the screen.

After a short time has elapsed from the time that the screen is first filled, the upper $\frac{1}{4}$ to $\frac{1}{2}$ inch of bedding material is skimmed from the screen into the bin B, preferably using a small whisk broom and skimming toward the open end of the frame. This exposes more of the bedding material to the overhead light, thereby driving the worms even deeper into the bedding material.

Now additional bedding material is pushed from the breaking board onto the screen, and the skimming process is repeated, driving more worms from upper portions of the bedding material toward the screen. This continues until all bedding material has been removed from the breaking board.

The skimming process is now repeated, skimming one shallow layer of the bedding material at a time from the screen back into the bin. Each time this occurs more bedding material is exposed to the overhead light, and the worms work more deeply into the bedding material. The skimming process is repeated until all worms reach the screen 20 itself.

At this point the light-sensitive worms work their way through the screen openings, attracted by the darkness below within the tray. However, those worms which are not long enough to reach and feel the inside bottom surface 60 of the tray while still clinging at one end to the screen do not drop from the screen into the tray, but instead remain on the screen. However, those worms 2½ inches in length or longer which can reach to and feel the inside bottom surface of the tray while still clinging to the screen, release their grip on the screen and drop to the bottom of the tray where they remain. This entire skimming process is repeated until all of the mature worms long enough to be harvested are collected in the bottom of the tray and all of the smaller, immature worms and eggs in the bedding material have been skimmed from the screen back into the bin where the eggs can hatch and the smaller worms can mature for harvesting at a later time.

With the skimming process completed, the tray is removed from the frame so that the worms in it can be collected, processed and packaged for transportation and sale.

With the harvesting process of one bin completed, another tray can be inserted into the bin and secured with the pins 54, the wheel and axle set replaced on the legs, and the harvester wheeled to the next bin where the harvesting operation is repeated.

To preserve the worms collected in the bottom of the tray, a few pounds of wet peat moss may be placed in the tray on the plastic liner before the skimming process begins. The method of harvesting described has been used by one person to harvest up to 20,000 worms per hour. Prior manual picking method would have required ten people working for the same length of time to harvest the same number of worms. This method has been used successfully to harvest Red Wiggler worms, which are the most common type raised commercially.

Example

Suitable but not required dimensions for a harvester in accordance with the invention are, for the frame, 72 inches long overall by 24 inches wide with the breaking board portion being 24 by 24 inches and the screen portion covering the remaining 48 inches of the frame length. The worm collection tray or drawer is 23½ inches wide by 45 inches long with a ⅜ inch plywood bottom spaced approximately 1½ inches below the upper edges of the tray sides, which can be made of 2½ inch by ¾ inch stock. The legs are each 36 inches long and can be made of 2 inch by 2 inch wood stock with the angle braces being 39 inches long, as are the cross braces. The axle blocks are 2 by 2 inch wood 12 inches long fastened to the backs of the legs, with a ½ inch notch 2 inches deep cut into one side of each block facing the leg to form the axle slot. The axle and wheel set includes a 33 inch long axle made of ½ inch steel bar joined at its opposite ends to 7 inch diameter wheels.

Having illustrated and described the principles of my invention by what is presently a preferred embodiment, it should be apparent to those persons skilled in the art that such embodiment can be modified without departing from such principles. I claim as my invention all such embodiments and modifications as come within the true spirit and scope of the following claims.

I claim:
1. A worm harvester comprising:
   means defining a frame bounding a frame opening,
   a screen carried by said frame and spanning said frame opening to define a planar screen surface, said screen having screen openings of a size such as to enable worms to be harvested to pass therethrough and to support worm bedding material thereon,
   and means defining a removable tray positionable within said frame opening below said screen surface for receiving worms passing through said screen,
   said tray having a dark-colored inside bottom surface,
   said inside bottom surface being planar, generally parallel to said screen surface, and positioned below said screen surface a distance no greater than the minimum length of worms desired to be harvested,
   means defining a breaking board within said frame along a boundary edge of said screen, said breaking board having an upper surface along said boundary edge at a level no lower than the level of said screen surface,
   said frame including opposite sidewall portions bordering and extending above the levels of said screen and breaking board surfaces and an endwall portion at one end of said frame bordering said breaking board and extending above said breaking board surface, the opposite end of said frame having an endwall with an upper edge bordering said screen and terminating at a level no higher than said screen surface.
2. The device of claim 1 wherein said tray has an inside bottom surface lined with a dark plastic sheet.
3. The device of claim 1 wherein said tray is removably mounted within said frame such that the inside bottom surface of said tray is spaced about 2½ inches below said screen surface.
4. The device of claim 1 including leg means supporting at least one end portion of said frame.
5. The device of claim 1 wherein said frame includes opposite side frame extension portions bordering the opposite sides of said screen and breaking board and an end frame extension portion bordering said breaking board at one end of said frame, said side and end extension portions extending above the levels of said screen and breaking board surfaces, the opposite end of said frame being open above said screen surface.
6. The device of claim 1 wherein said tray is removably mounted within said frame below said screen by retractable pins carried by said frame.
7. The device of claim 1 including leg means supporting a portion of said frame in the region of said breaking board, and a wheel and axle set mounted on the lower end of said leg means.
8. The method of harvesting worms comprising:
   placing a pile of worm bedding material containing worms to be harvested on an impermeable surface,
   pushing a quantity of the bedding material onto an adjacent surface of a screen capable of supporting said bedding material while permitting worms to pass therethrough, and covering said screen surface with said bedding material to a substantially uniform depth while the upper surface of said bedding material is exposed from above to a source of light, positioning a dark worm-receiving surface in a dark area below and generally parallel to said screen surface at a distance from said screen surface which is no greater than the minimum length of the worms desired to be harvested, skimming a thin upper layer of bedding material from said screen surface to cause the worms to work their way down deeper into the bedding material remaining on said surface, and then repeating said skimming until the worms in said bedding material have worked their way down to the screen and the larger worms have passed through the screen to the dark worm-receiving surface therebelow.

9. The method of claim 8 wherein an edge portion of the screen is placed on an upper edge of an open worm-breeding bin and the bedding material and any smaller worms remaining therein are skimmed into said bin from said screen surface.

10. The method of claim 8 including removing the worm-receiving surface from below the screen when all of the bedding material has been skimmed and collecting the worms from said surface for processing and packaging.

11. The method of claim 8 including skimming while the screen is at a small declination from the horizontal in the direction of skimming.

* * * * *